US012032333B2

(12) United States Patent
Morita et al.

(10) Patent No.: US 12,032,333 B2
(45) Date of Patent: Jul. 9, 2024

(54) TIME DIFFERENCE CORRECTION MECHANISM AND TIMEPIECE WITH TIME DIFFERENCE CORRECTION MECHANISM

(71) Applicant: CITIZEN WATCH CO., LTD., Tokyo (JP)

(72) Inventors: Shoichiro Morita, Kawagoe (JP); Kazuya Imamura, Iida (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 481 days.

(21) Appl. No.: 17/420,372

(22) PCT Filed: Dec. 6, 2019

(86) PCT No.: PCT/JP2019/047837
§ 371 (c)(1),
(2) Date: Jul. 1, 2021

(87) PCT Pub. No.: WO2020/144989
PCT Pub. Date: Jul. 16, 2020

(65) Prior Publication Data

US 2022/0091561 A1 Mar. 24, 2022

(30) Foreign Application Priority Data

Jan. 7, 2019 (JP) ................................ 2019-000527

(51) Int. Cl.
*G04B 15/04* (2006.01)
*G04B 13/02* (2006.01)
*G04B 15/14* (2006.01)

(52) U.S. Cl.
CPC ............. *G04B 15/04* (2013.01); *G04B 13/02* (2013.01); *G04B 15/14* (2013.01)

(58) Field of Classification Search
CPC ......... G04B 15/04; G04B 13/02; G04B 15/14
See application file for complete search history.

(56) References Cited

U.S. PATENT DOCUMENTS 6,148,979 A * 11/2000 Roach ..................... F16D 43/16
74/577 M
2016/0026154 A1* 1/2016 Courvoisier ......... G04B 13/022
368/184
2019/0332061 A1* 10/2019 Mabillard .............. G04B 13/00

FOREIGN PATENT DOCUMENTS

CH 615556 A3 2/1980
EP 1895370 A2 * 3/2008 ........... G04B 11/003
(Continued)

OTHER PUBLICATIONS

International Search Report from corresponding International Application No. PCT/JP2019/047837, mailed on Feb. 10, 2020, 4 pages.

*Primary Examiner* — Edwin A. Leon
*Assistant Examiner* — Kevin Andrew Johnston
(74) *Attorney, Agent, or Firm* — Tucker Ellis LLP

(57) ABSTRACT

A time difference correction mechanism includes a cylinder index star wheel that includes teeth and is connected to an hour hand, a cylinder index gear that includes teeth and is connected to a minute hand, the cylinder index gear provided radially outward of the cylinder index star wheel on a same plane as the teeth, a cylinder index lever disposed in the cylinder index gear on a same plane as the cylinder index gear, and a cylinder index spring disposed in the cylinder index gear on the same plane as the cylinder index gear. The cylinder index lever is movable between an engaged position where a claw engages with at least one of the teeth and a disengaged position where the claw disengages with the at least one of the teeth . The cylinder index spring is configured to bias the cylinder index lever to the engaged position.

10 Claims, 6 Drawing Sheets

(56) References Cited

FOREIGN PATENT DOCUMENTS

| | | | | |
|---|---|---|---|---|
| EP | 1895370 | A2 | | 3/2008 |
| JP | 200858011 | A | | 3/2008 |
| JP | 200858012 | A | | 3/2008 |
| JP | 2008058011 | A | * | 3/2008 |
| JP | 6180296 | B2 | | 8/2017 |
| JP | 2017161255 | A | | 9/2017 |

* cited by examiner

TIME DIFFERENCE CORRECTION MECHANISM AND TIMEPIECE WITH TIME DIFFERENCE CORRECTION MECHANISM

CROSS-REFERENCE TO RELATED APPLICATION

This application is based upon and claims the benefit of priority from Japanese Patent Application No. 2019-000527 filed on Jan. 7, 2019, the entire disclosure of which is incorporated herein by reference.

TECHNICAL FIELD

A present disclosure relates to a time difference correction mechanism and a timepiece with the time difference correction mechanism.

BACKGROUND ART

As an hour or time difference correction mechanism provided in a timepiece, a tubular or cylinder index wheel is known in the art. The cylinder index wheel is provided between an hour wheel to which an hour hand is fixed and a center wheel to which a minute hand is fixed. The cylinder index wheel is configured to switch a first condition where the coupling of the hour wheel and the center wheel is maintained and a second condition where the coupling is released (see JP 6180296B, for example).

In the cylinder index wheel of the time difference correction mechanism disclosed in JP 6180296B, a cylinder index gear linked to the center wheel is coaxially arranged with a cylinder index star wheel linked to an hour wheel. The cylinder index wheel is provided with a cylinder index lever and a cylinder index spring on the cylinder index gear plate. The cylinder index lever rotates between a first position where the lever meshes with the cylinder index star wheel and a second position where the lever does not mesh with the cylinder index star wheel is released. The cylinder index spring presses or biases the cylinder index lever to mesh with the cylinder index star wheel.

JP 2017-161255A discloses a slip mechanism where a jumper is provided on the same plane as a first reduction wheel.

SUMMARY

The cylinder index wheel disclosed in JP 6180296B has a configuration in which the cylinder index gear is stacked with the cylinder index lever and the cylinder index spring. Therefore, it is necessary to reduce the thickness of the cylinder index wheel.

In the slip mechanism disclosed in JP 2017-161255A, the thickness of the slip mechanism may be reduced since the jumper is formed on the same plane as a first reduction wheel. However, it is necessary to form the jumper to be very thin or long to obtain the elasticity of the jumper. In a case that the jumper is formed to be relatively thin, the feeling of moderation (feeling of response that is transmitted to fingers that operate crown) may be reduced when the jumper engages with the jumper pinion. In the case that the jumper is formed to be relatively long, the slip mechanism becomes undesirably large.

The present disclosure has been made considering the above issues and an object of the present disclosure is to provide a time difference correction mechanism and a timepiece with the time difference correction mechanism that reduce the thickness thereof without increasing the size and do not reduce the feeling of moderation.

A first aspect of the present disclosure relates to a time difference correction mechanism. The time difference correction mechanism includes a cylinder index star wheel that includes teeth on an outer circumference thereof and is connected to an hour hand, a cylinder index gear that includes teeth on an outer circumference thereof and is connected to a minute hand, the cylinder index gear provided radially outward of the cylinder index star wheel and disposed on a same plane as the teeth of the cylinder index star wheel and coaxially with the cylinder index star wheel, a cylinder index lever that is disposed in the cylinder index gear and on a same plane as the cylinder index gear, the cylinder index lever including a claw at one end, and a cylinder index spring that is disposed in the cylinder index gear and on the same plane as the cylinder index gear, wherein the cylinder index lever is configured to be movable between an engaged position where the claw of the cylinder index lever engages with at least one of the teeth of the cylinder index star wheel and a disengaged position where the claw disengages with the at least one of the teeth of the cylinder index star wheel, and wherein the cylinder index spring is configured to bias the cylinder index lever to the engaged position.

A second aspect of the present disclosure relates to a timepiece with a time difference correction mechanism. The timepiece includes a time difference correction mechanism according to the present disclosure, an hour hand that is connected to the cylinder index star wheel of the time difference correction mechanism, and a minute hand that is connected to the cylinder index gear of the time difference correction mechanism

DETAILED DESCRIPTION

Hereinafter, an embodiment of a time difference correction mechanism and a timepiece with the time difference correction mechanism according to the present disclosure will be described with reference to the drawings.

Figure 1:
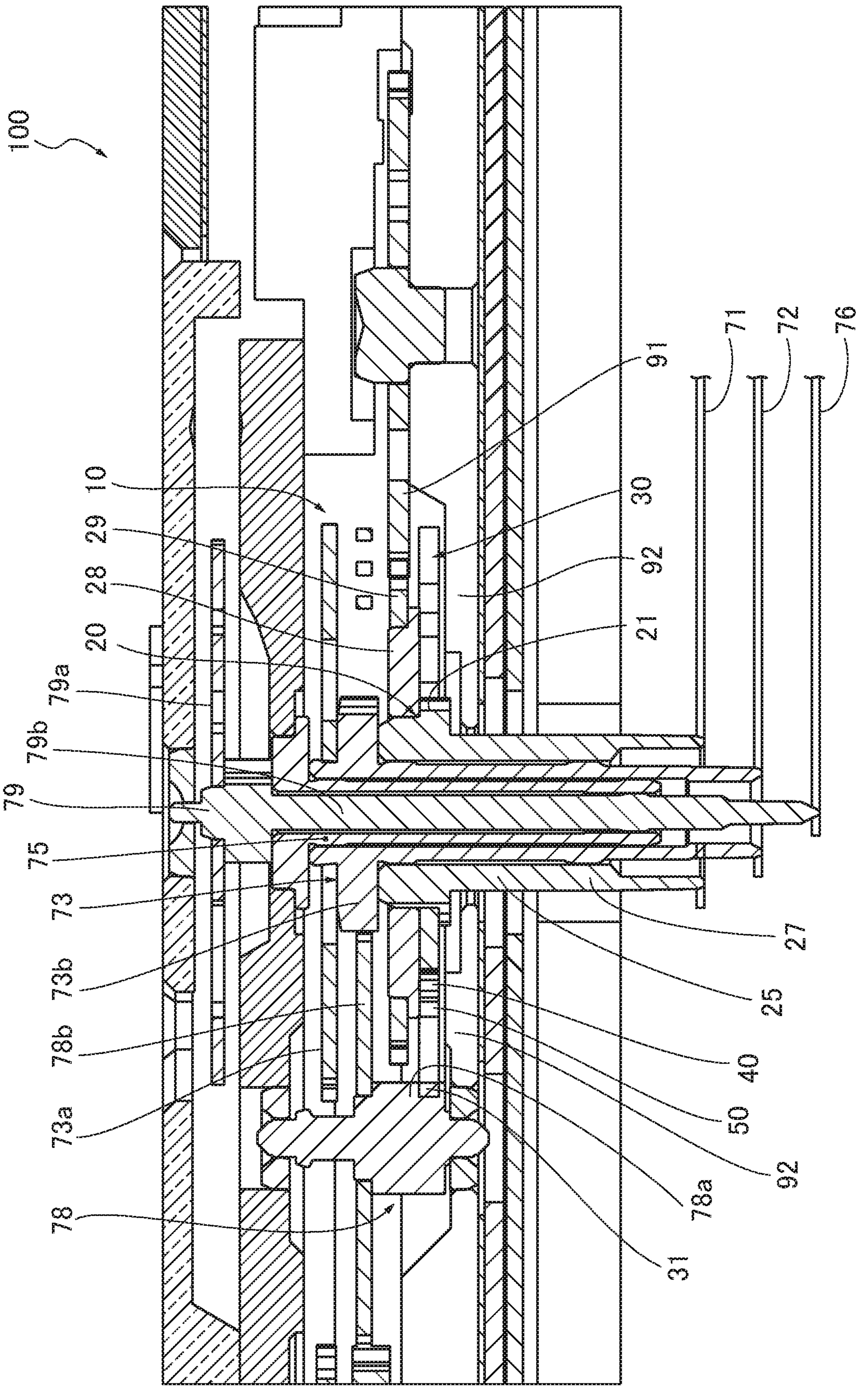
FIG. 1 is a cross-sectional view illustrating a main portion of a timepiece that includes a time difference correction mechanism of an embodiment of the present disclosure.
Figure 2A:
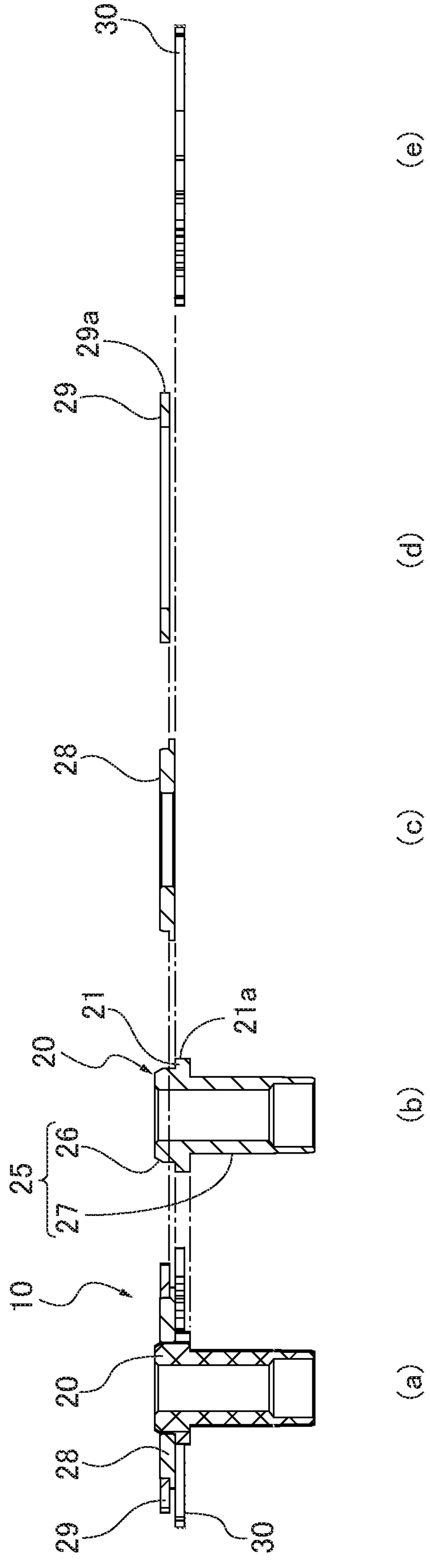
FIG. 2A is a cross-sectional view illustrating the time difference correction mechanism shown in FIG. 1 and components thereof, a section (a) entirely showing the time difference correction mechanism, a section (b) showing a cylinder index star wheel, a section (c) showing a gear seat, a section (d) showing an input gear, and a section (e) showing a cylinder index gear provided with a cylinder index lever and a cylinder index spring.

(Embodiment) FIG. 1 is a cross-sectional view illustrating a main portion of a timepiece 100 including an hour or time difference correction mechanism 10 (cylinder index wheel) according to an embodiment of the present disclosure. FIG. 2A is a cross-sectional view illustrating the time difference correction mechanism 10 shown in FIG. 1 and the components thereof. In FIG. 2A, a section (a) entirely shows the time difference correction mechanism 10, a section (b) shows a cylinder index star wheel 20, a section (c) shows a gear seat 28, a section (d) shows an input gear 29, and a section (e) shows a cylinder index gear 30 provided with a cylinder index lever 40 and a cylinder index spring 50.

Figure 2B:
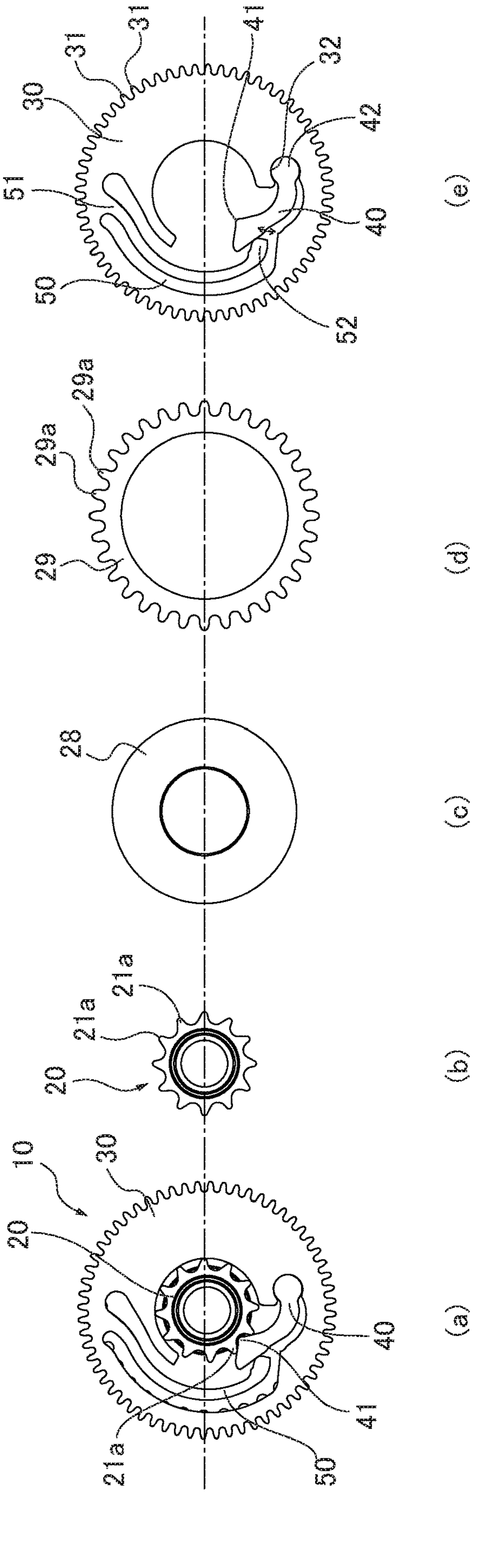
FIG. 2B is a bottom view illustrating the time difference correction mechanism shown in FIG. 1 and the components thereof, a section (a) entirely showing the time difference correction mechanism, a section (b) showing the cylinder index star wheel, a section (c) showing the gear seat, a section (d) showing the input gear, a section (e) showing the cylinder index gear provided with the cylinder index lever and the cylinder index spring.

FIG. 2B is a bottom view illustrating the time difference correction mechanism 10 shown in FIG. 1 and the components thereof. In FIG. 2B, a section (a) entirely shows the time difference correction mechanism 10, a section (b) shows the cylinder index star wheel 20, a section (c) shows the gear seat 28, a section (d) shows the input gear 29, and a section (e) shows the cylinder index gear 30 provided with the cylinder index lever 40 and the cylinder index spring 50.

As shown in FIGS. 1, 2A, and 2B, the time difference correction mechanism 10 of this embodiment includes the cylinder index star wheel 20, the cylinder index gear30, the cylinder index lever 40, and the cylinder index spring 50. The cylinder index star wheel 20 is connected to an hour hand 71 of the timepiece 100 with the time difference correction mechanism (referred to as timepiece 100 hereinafter) of this embodiment. The cylinder index gear 30 is connected to a minute hand 72 of the timepiece 100. The cylinder index lever 40 is disposed within the thickness of the cylinder index gear 30. The cylinder index spring 50 is disposed within the thickness of the cylinder index gear 30.

The cylinder index star wheel 20 includes a gear 21. The gear 21 is formed on a cylinder portion 25 coaxial therewith. The gear 21 includes teeth 21*a* on the outer circumference thereof. The gear 21 includes twelve teeth 21*a,* for example. The cylinder portion 25 includes an upper cylinder portion 26 and a lower cylinder portion 27. As shown in FIG. 2A, the upper cylinder portion 26 is a part of the cylinder portion 25 above the gear 21, and the lower cylinder portion 27 is a part of the cylinder portion 25 below the gear 21.

As shown in FIGS. 2A and 2B, a gear seat 28 has a circular ring shape and is press-fitted into the upper cylinder portion 26. An input gear 29 is fixed to the outer circumference of the gear seat 28. The input gear 29 includes teeth 29*a* on the outer circumference thereof. The teeth 29*a* mesh with a time difference correction wheel 91 of the timepiece 100.

It should be noted that the gear seat 28 may be integrally formed with the input gear 29. Similarly, the gear seat 28 may also be integrally formed with the upper cylinder portion 26.

As shown in FIG. 1, the hour hand 71 of the timepiece 100 is fixed to the lower cylinder portion 27. In other words, the cylinder index star wheel 20 is connected to the hour hand 71. The gear 21 includes twelve teeth 21*a*. Accordingly, when the cylinder index star wheel 20 rotates by one of the teeth 21*a,* the hour hand 71 rotates by an angle of 30 degrees. The rotation of the hour hand 71 by the angle of 30 degrees corresponds to one hour indicated by the hour hand 71.

A center wheel 73 is inserted into the cylinder portion 25 coaxially therewith. The minute hand 72 of the timepiece 100 is fixed to the center wheel 73. A center pipe 75 is inserted into the center wheel 73 coaxially with the cylinder portion 25. A center bridge or center wheel bridge in a movement of the timepiece 100 is fixed to the center pipe 75. A second hand shaft 79*b* of a seconds wheel or fourth wheel 79 is inserted into the center pipe 75 coaxially with the cylinder portion 25. A second hand 76 of the timepiece 100 is fixed to the second hand shaft 79*b*. The center pipe 75 functions as a bulkhead that prevents the inclinations of the center wheel 73 and the second hand shaft 79*b* and also prevents the center wheel 73 from rotating with the second hand shaft 79*b*.

As shown in FIGS. 1, 2A, and 2B, the cylinder index gear 30 is provided radially outward of the cylinder index star wheel 20. The cylinder index gear 30 is disposed on the same plane as the teeth 21*a* of the cylinder index star wheel 20 and coaxially with the cylinder index star wheel 20.

The cylinder index gear 30 includes teeth 31 on the outer circumference thereof. The teeth 31 mesh with a pinion 78*a* of a minute wheel 78 of the timepiece 100. A gear 78*b* of the minute wheel 78 meshes with a pinion 73*b* of the center wheel 73 to which the minute hand 72 is fixed. Accordingly, the cylinder index gear 30 is connected to the minute hand 72.

The cylinder index lever 40 is formed in a substantially arc shape. The cylinder index lever 40 includes a claw 41 that protrudes radially inwardly at one end and a rotation supported portion 42 at the other end. The rotation supported portion 42 includes an outer circumferential edge that is formed in an arc shape.

In the cylinder index lever 40, the outer circumferential edge of the rotation supported portion 42 is fitted into a bearing hole 32 formed in the cylinder index gear 30. The cylinder index lever 40 is supported on the same plane as the cylinder index gear 30. The rotation supported portion 42 pivots within the bearing hole 32 and accordingly, the cylinder index lever 40 pivots relative to the cylinder index gear 30.

The cylinder index lever 40 is sandwiched between the gear seat 28 (example of support portion) located above the lever 40 and a main plate 92 and/or a bridge (example of support portion) in the movement of the timepiece 100 located below the lever 40 so that the position of the lever 40 in the axial direction is restrained. In the cylinder index lever 40, the outer diameter of the lower part of the rotation supported portion 42 in the axial direction (thickness direction) may be formed to be smaller than the outer diameter of the upper part thereof. Correspondingly, the bearing hole 32 may be formed as a hole with a step (i.e., stepped hole) where the inner diameter of the lower part of the hole 32 in the axial direction (thickness direction) is smaller than the inner diameter of the upper part of the hole 32. With this configuration, the position in the axial direction of the cylinder index lever 40 may be restrained with a bottom portion of the lever 40 supported by the bearing hole 32, which is the stepped hole (example of support portion), and with an upper portion of the lever 40 abutted by the gear seat 28.

Figure 3:
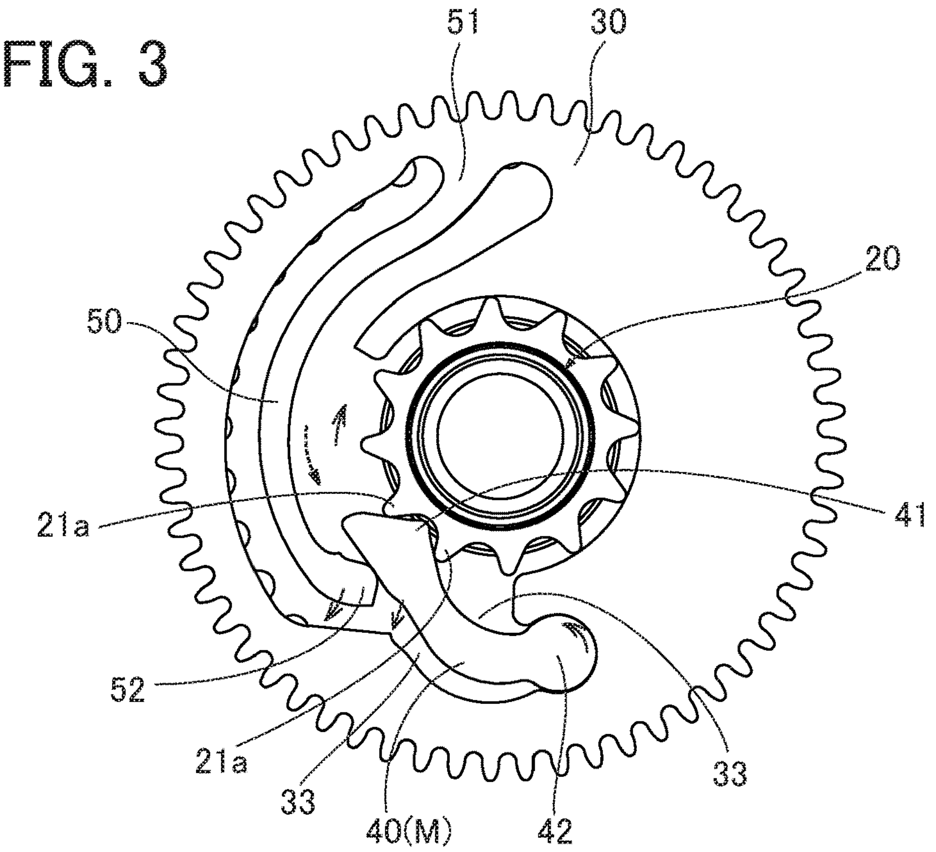
FIG. 3 is a bottom view corresponding to that of FIG. 2B and illustrating the time difference correction mechanism when the cylinder index lever is in an engaged position.
Figure 4:
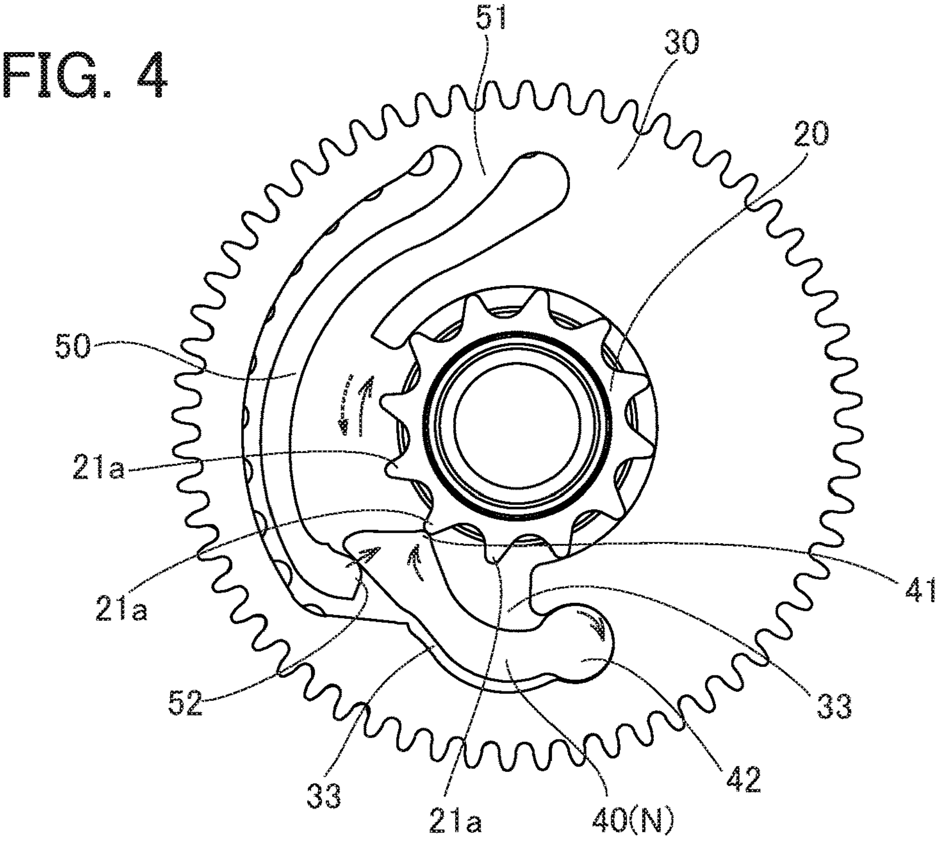
FIG. 4 is a bottom view corresponding to that of FIG. 2B and illustrating the time difference correction mechanism when the cylinder index lever is in a disengaged position.

FIG. 3 is a bottom view corresponding to that of FIG. 2B and illustrating the time difference correction mechanism 10 when the cylinder index lever 40 is in the engaged position M. FIG. 4 is a bottom view corresponding to that of FIG. 2B and illustrating the time difference correction mechanism 10 when the cylinder index lever 40 is in the disengaged position N.

The cylinder index gear 30 includes a recess or notch 33. The notch 33 is provided in a moving range of the cylinder index lever 40 between the engaged position M shown in FIG. 3 and the disengaged position N shown in FIG. 4. In the engaged position M, the claw 41 of the cylinder index lever 40 engage with the teeth 21*a* of the cylinder index star wheel 20 by pivoting about the rotation supported portion 42. In the disengaged position N, the claw 41 is disengaged with the teeth 21*a*. Thereby, the cylinder index lever 40 pivots or rotates about the rotation supported portion 42 between the engaged position M and the disengaged position N.

The cylinder index spring 50 is provided in the cylinder index gear 30 on the same plane as the cylinder index gear 30. The cylinder index spring 50 substantially extends in the circumference direction of the cylinder index gear 30. The cylinder index spring 50 includes a fixed end 51 at one end and a free end 52 at the other end. The fixed end 51 is integral with the cylinder index gear 30 while the free end 52 is cantilevered. The deflection of the cantilevered free end 52 provides elasticity to the spring.

The free end 52 of the cylinder index spring 50 contacts the outer circumferential side of the claw 41 of the cylinder index lever 40 when the lever 40 is in the engaged position M. The fixed end 51 of the cylinder index spring 50 is formed on the side opposite to the rotation supported portion 42 in the radial direction with the claw 41 therebetween.

In the case that the cylinder index lever 40 is in the disengaged position N, the cylinder index spring 50 is displaced radially outwardly more than when the free end 52 is unloaded, and accordingly, the cylinder index spring 50 bends or flexes. The elastic force by the flex of the cylinder index spring 50 presses the cylinder index lever 40 to the engaged position M. In other words, the cylinder index spring 50 biases the cylinder index lever 40 to the engaged position M.

When the cylinder index lever 40 is in the engaged position M, the cylinder index gear 30 is engaged with the cylinder index star wheel 20. If there is no large torque difference between the cylinder index gear 30 and the cylinder index star wheel 20, the cylinder index gear 30 and the cylinder index star wheel 20 integrally rotate by the torque input to one of the cylinder index gear 30 and the cylinder index star wheel 20.

On the other hand, when the torque input to the cylinder index star wheel 20 exceeds the torque acting on the cylinder index gear 30, the torque input to the cylinder index star wheel 20 causes the teeth 21*a* of the cylinder index star wheel 20 to push the claw 41 of the cylinder index lever 40 as shown in FIG. 4 so that the cylinder index lever 40 pivots about the rotation supported portion and moves to the disengaged position N. Specifically, the torque acting on the cylinder index gear 30 is input from the motor of the timepiece 100 to the center wheel 73 and then to the cylinder index gear 30 via the minute wheel 78 to indicate time.

Thereby, the cylinder index star wheel 20 rotates relative to the cylinder index gear 30. When the claw 41 pushed by the teeth 21*a* climbs over the one of the teeth 21*a* because of the rotation of the cylinder index star wheel 20, the biasing force of the cylinder index spring 50 returns or replaces the cylinder index lever 40 to the engaged position M shown in FIG. 3.

The cylinder index lever 40 is shorter and thicker than the cylinder index spring 50 and has higher rigidity than cylinder index spring 50.

(Effect) Effects obtained by the time difference correction mechanism 10 and the timepiece 100 with the time difference correction mechanism configured as above will be described with regard to a normal hand movement operation to indicate time, a time correction operation performed by linking the hour hand 71 and the minute hand 72, and a time difference correction operation to move only the hour hand 71 by an hour without moving the minute hand 72.

(Normal Hand Movement Operation) During the normal hand movement operation of the timepiece 100 according to this embodiment, the drive torque from a motor (not shown) is input to the gear 79*a* of the fourth wheel 79 and the gear 73*a* of the center wheel 73 with a cycle corresponding to the time display and accordingly, the fourth wheel 79 and the center wheel 73 rotate with a corresponding cycle.

The rotation of the fourth wheel 79 rotates the second hand 76 fixed to the second hand shaft 79*b* to indicate a second. The rotation of the center wheel 73 rotates the minute hand 72 fixed to the center wheel 73 to indicate a minute.

Also, the rotation of the center wheel 73 rotates the minute wheel 78 that meshes with the pinion 73*b* of the center wheel 73, and the rotation of the minute wheel 78 rotates the cylinder index gear 30. When the cylinder index gear 30 rotates, the cylinder index lever 40 rotates therewith. The torque is also input to the cylinder index star wheel 20 and the star wheel 20 rotates with the cylinder index lever 40 (i.e., cylinder index gear 30) since the cylinder index lever 40 is in the engaged position M.

The cylinder index star wheel 20 engages with the time difference correction wheel 91 via the gear seat 28 and the input gear 29. However, the time difference correction wheel 91 does not engage with other components during the normal hand movement operation, and accordingly, no torque is input to the time difference correction wheel 91. As a result, only the torque from the cylinder index lever 40 is input to the cylinder index star wheel 20, and the cylinder index star wheel 20 rotates with the cylinder index gear 30. Thereby, the hour hand 71 fixed to the cylinder index star wheel 20 rotates to indicate an hour.

The rotation of the hour hand 71 and the rotation of the minute hand 72 have a certain relationship because of components such as the minute wheel 78 disposed therebetween (e.g., relationship between rotation of hour hand 71 by angle of 30 degrees and rotation of minute hand 72 by angle of 360 degrees). The hour hand 71 and the minute hand 72 indicate or display a predetermined time (hour and minute, respectively) at respective positions with the relationship maintained.

(Time Correction Operation) During the time correction of the timepiece 100 according to this embodiment, an operation torque for the time correction input to a setting stem or winding stem (not shown) is then input to the minute wheel 78 from the winding stem via a transmission mechanism (not shown) to rotate the minute wheel 78. Thereby, the pinion 73*b* of the center wheel 73 that meshes with the gear 73*a* of the minute wheel 78 rotates, and the rotation of the center wheel 73 rotates the minute hand 72.

By fixing any of the gears or wheels that are disposed from the motor to the gear 73*a* of the center wheel 73 and mesh with each other such that the gear 73a of the center wheel 73 does not rotate during the time correction, the gear 73a slips against the pinion 73b and accordingly, the motor and the second hand 76 fixed to the second hand shaft 79b do not rotate even if the pinion 73b of the center wheel 73 rotates by the operation torque from the winding stem.

In addition, the rotation of the minute wheel 78 rotates the cylinder index gear 30. Then, the rotation of the cylinder index gear 30 rotates the cylinder index lever 40. The rotational torque is also input to the cylinder index star wheel 20 since the cylinder index lever 40 is in the engaged position M.

During the time correction operation similar to the normal hand movement operation, the time difference correction wheel 91 does not mesh with other components, and accordingly, no torque is acting on the time difference correction wheel 91. As a result, only the torque from the cylinder index lever 40 is input to the cylinder index star wheel 20, and the cylinder index star wheel 20 rotates together with the cylinder index gear 30. Thereby, the hour hand 71, which is fixed to the cylinder index star wheel 20, rotates.

The rotation of the hour hand 71 and the rotation of the minute hand 72 have a certain relationship with each other because of components such as the minute wheel 78 disposed therebetween (e.g., relationship between rotation of hour hand 71 by angle of 30 degrees and rotation of minute hand 72 by angle of 360 degrees). Accordingly, the indicating positions (indications) of the hour hand 71 and the minute hand 72 can be adjusted or modified with the relationship maintained.

(Time Difference Correction Operation) During the time difference (hour difference) correction of the timepiece 100 of this embodiment, the operation torque for the time difference correction input to the winding stem (not shown) is transmitted from the winding stem to the time difference correction wheel 91 to rotate the time difference correction wheel 91. When the time difference correction wheel 91 rotates, the torque for rotating the cylinder index star wheel 20 that engages with the time difference correction wheel 91 (via input gear 29 and gear seat 28) is input.

On the other hand, the drive torque during the normal hand movement operation is input to the cylinder index gear 30 via the minute wheel 78. The torque acting on the cylinder index gear 30 exceeds the torque input to the cylinder index star wheel 20. Accordingly, the teeth 21a of the cylinder index star wheel 20 pushes the claw 41 of the cylinder index lever 40 while performing the normal hand movement operation as shown in FIG. 4 so that the cylinder index lever 40 pivots about the rotation supported portion 42 and moves to the disengaged position N.

Thereby, the cylinder index star wheel 20 rotates relative to the cylinder index gear 30. When the claw 41 pushed by the teeth 21a climbs over one of the teeth 21a because of the rotation of the cylinder index star wheel 20, the biasing force of the cylinder index spring 50 replaces the cylinder index lever 40 to the engaged position M shown in FIG. 3.

When the cylinder index star wheel 20 rotates by one of the teeth 21a, the hour hand 71 rotates by an angle corresponding to one hour from the indicating position before the rotation. On the other hand, the minute hand 72 keeps moving with the normal hand movement since the cylinder index star wheel 20 does not rotate with the cylinder index gear 30.

Therefore, only the hour hand 71 can rotates by an hour without affecting the minute hand 72 so that the time difference correction can be achieved.

According to the time difference correction mechanism 10 and the timepiece 100 with the time difference correction mechanism of this embodiment as described above, the normal hand movement, the time correction, and the time difference correction can be performed. Further, in the time difference correction mechanism 10 and the timepiece 100 with the time difference correction mechanism of this embodiment, the cylinder index gear 30, the cylinder index star wheel 20, the cylinder index lever 40, and the cylinder index spring 50 are provided on the same plane. Accordingly, the thickness of the time difference correction mechanism 10 in the axial direction can be reduced, and accordingly, the thickness of the timepiece 100 including the time difference correction mechanism 10 can also be reduced.

Moreover, in the time difference correction mechanism 10 and the timepiece 100 with the time difference correction mechanism of this embodiment, the cylinder index lever 40, which includes the claw 41 engaging with the teeth 21a of the cylinder index star wheel 20, is not moved by the elastic deformation of the lever 40 itself but moved by its rotation relative to the cylinder index gear 30 between the engaged position M and the disengaged position N. Therefore, it is unnecessary to form the cylinder index lever 40 to be relatively thin and/or relatively long.

Accordingly, in the time difference correction mechanism 10 of this embodiment, the rotation supported portion 42, in which the claw 41 of the cylinder index lever 40 moves can be placed more freely since the cylinder index lever 40 is formed independently from the cylinder index spring 50. Thereby, it is unnecessary to form the time difference correction mechanism 10 of this embodiment relatively large in size. In addition, it is possible to prevent a decrease in the reaction force (feeling of moderation) transmitted to the winding stem when the claw 41 climbs over the teeth 21a during the time difference correction operation.

Moreover, in the time difference correction mechanism 10 of this embodiment, the rotation supported portion 42, in which the claw 41 of the cylinder index lever 40 moves, can be placed more freely. Accordingly, the shape of the claw 41 and the like can be designed more freely such that the feeling of moderation and the torque required upon being moved from the engaged position M to the disengaged position N can be similar regardless of the difference in the directions of rotation of the cylinder index star wheel 20.

Figure 5:
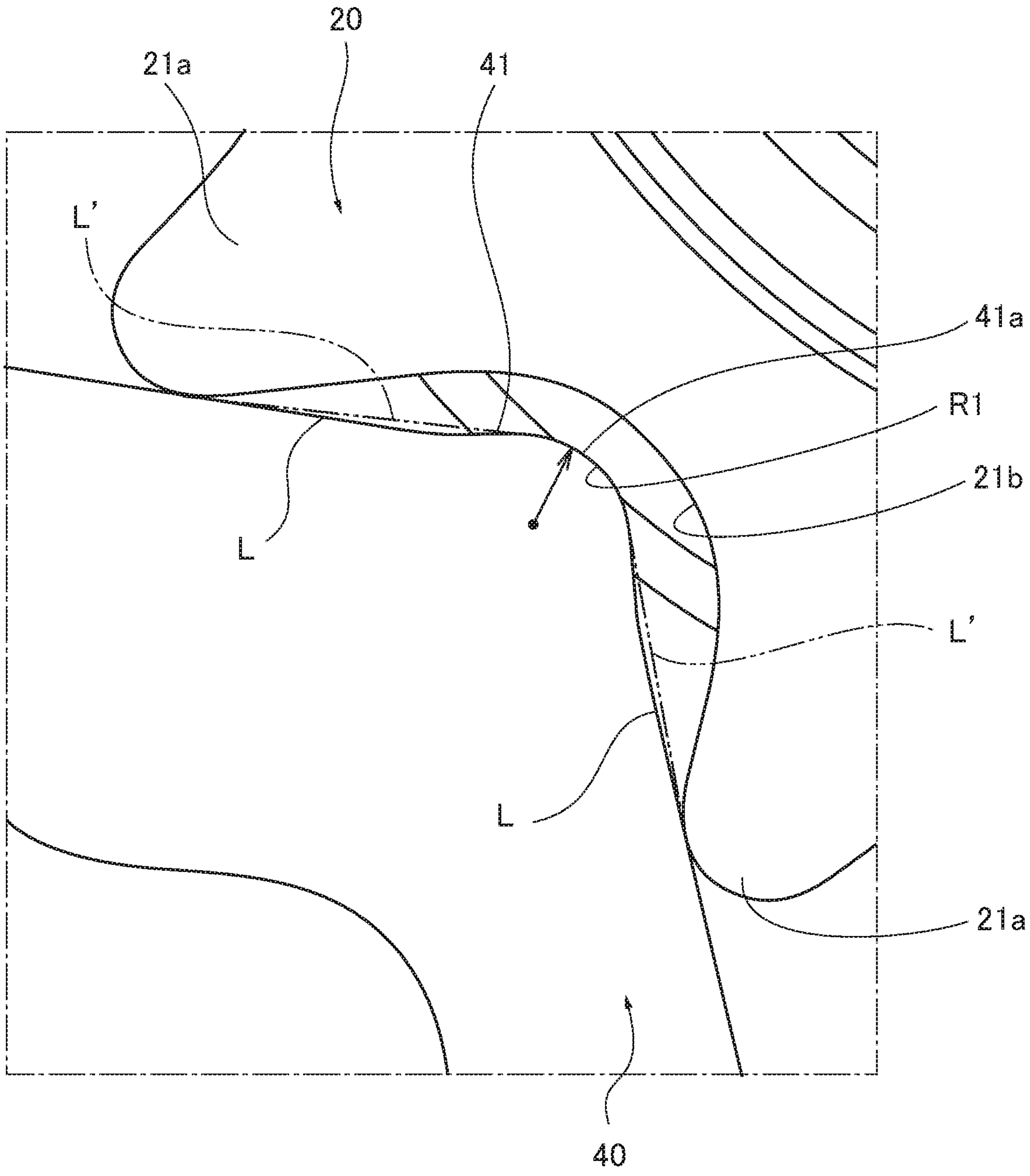
FIG. 5 is an enlarged view illustrating the shape of a claw of the cylinder index lever that meshes with teeth of the cylinder index star wheel.

FIG. 5 is an enlarged view illustrating the shape of the claw 41 of the cylinder index lever 40 that meshes with the teeth 21a of the cylinder index star wheel 20. As described above, it is important to set a relatively large reaction force (feeling of moderation) that is transmitted to the winding stem when the claw 41 climbs over the teeth 21a. Specifically, when the feeling of moderation transmitted to a user who operates the winding stem for the time difference correction is relatively small, the user may stop the time difference correction operation when the claw 41 is on the tip of one of the teeth 21a. In this case, the time difference correction operation cannot be properly performed.

Accordingly, it is necessary to notify the user that the hour hand 71 moves only by an angle corresponding to one hour, and it is preferable to increase the feeling of moderation.

The feeling of moderation can be increased by increasing the difference between load resistance when the cylinder index lever 40 engages with the cylinder index star wheel 20 before the claw 41 climbs over the teeth 21a and load resistance when the claw 41 is climbing over the teeth 21a. In the case that the contour of the claw 41 is formed by two straight lines L', L' (shown with double-dotted line) and a circular arc R1 adjacent to the two straight lines L', L' as shown in FIG. 5, the load resistance when a tip 41*a* of the claw 41 climbs over the teeth 21*a* is relatively small and accordingly the feeling of moderation is relatively small.

To this end, the feeling of moderation may be increased by reducing the intersecting angle of the two straight lines L', L' to increase inclination angles of the straight lines L', L' with respect to the tips of the teeth 21*a*. In this case, however, the tip of the circular arc R1 that connects the two straight lines L', L' may interfere with a tooth bottom 21*b* between the adjacent two teeth 21*a*, 21*a*.

On the other hand, as shown in FIG. 5, it is preferable that the claw 41 of this embodiment has a contour formed by two lines L, L, and the circular arc R1 connecting the lines L, L. These lines L, L form an intersecting angle larger than the intersecting angle between the two lines L', L'. Each of the two lines L, L curves relative to the tooth bottom 21*b* at a location before the intersection of the two lines L, L.

The claw 41 including the tip 41*a* as configured above can prevent the tip 41*a* from interfering with the tooth bottom 21*b* as in the case that the larger intersecting angle of the two lines L', L'. The feeling of moderation can be increased since the angles of the lines relative to the tips of the teeth 21*a* increase.

Figure 6:
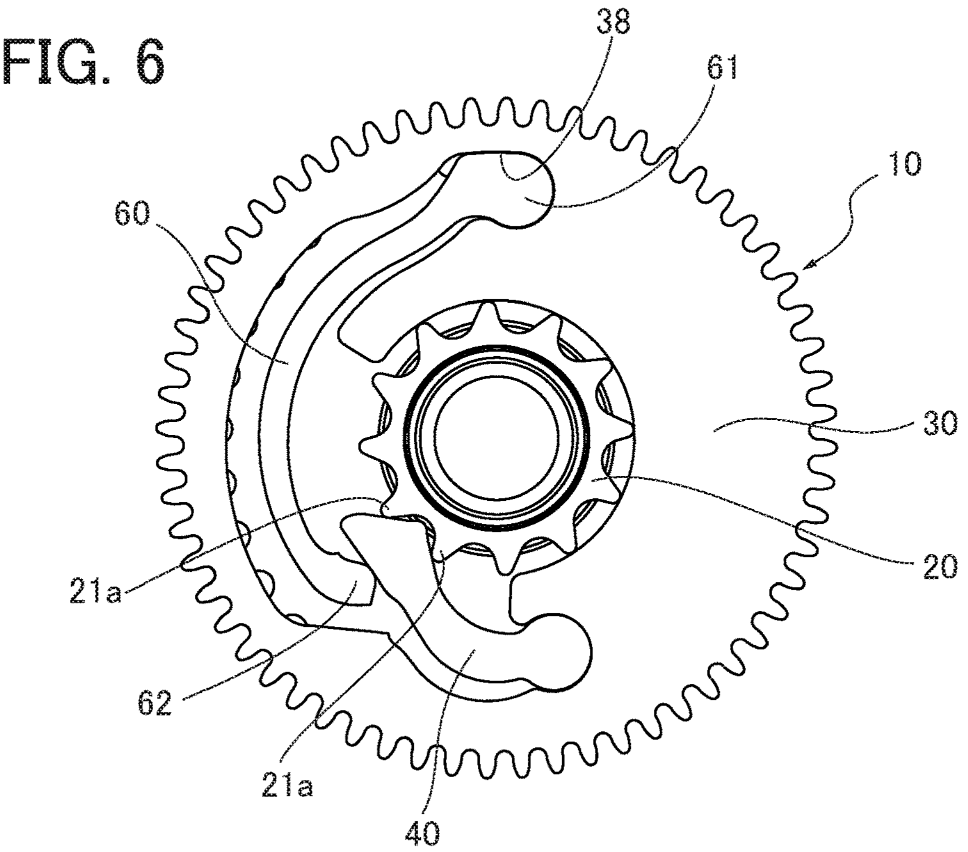
FIG. 6 is a bottom view corresponding to that of FIG. 2B and illustrating a first variation where another cylinder index spring is used instead of the cylinder index spring of the embodiment.

(First Variation) FIG. 6 is a bottom view corresponding to that of FIG. 2B and illustrating a first variation where another cylinder index spring 60 is used instead of the cylinder index spring 50 of the above embodiment. In the time difference correction mechanism 10 of the above embodiment, the fixed end 51 of the cylinder index spring 50 is integrally formed with the cylinder index gear 30. However, the cylinder index spring of the present disclosure may not be integrally formed with the cylinder index gear but may be separately formed therefrom.

Specifically, as shown in FIG. 6, the cylinder index spring 60, which is replaced with the cylinder index spring 50, includes a fixed end 61 corresponding to the fixed end 51, and a free end 62 corresponding to the free end 52. The cylinder index spring 60 is formed in an arch shape similar to the cylinder index spring 50.

On the other hand, the cylinder index spring 60 is formed independently from the cylinder index gear 30 and the fixed end 61 is fixed to a fixing hole 38 which is formed in the cylinder index gear 30. Accordingly, the cylinder index spring 60 is fixed to the cylinder index gear 30 and arranged on the same plane as the cylinder index gear 30.

It should be noted that the fixed end 61 does not rotate within the fixing hole 38 since the fixed end 61 has a shape different from an arc.

In this way, in the case that the cylinder index spring 60 is formed independently from the cylinder index gear 30, the cylinder index spring 60 can be made of a different material than that of the cylinder index gear 30. Accordingly, the cylinder index gear 30 may be made of a highly rigid material suitable for the cylinder index gear while the cylinder index spring 60 may be made of an elastic material suitable for the cylinder index spring.

Figure 7:
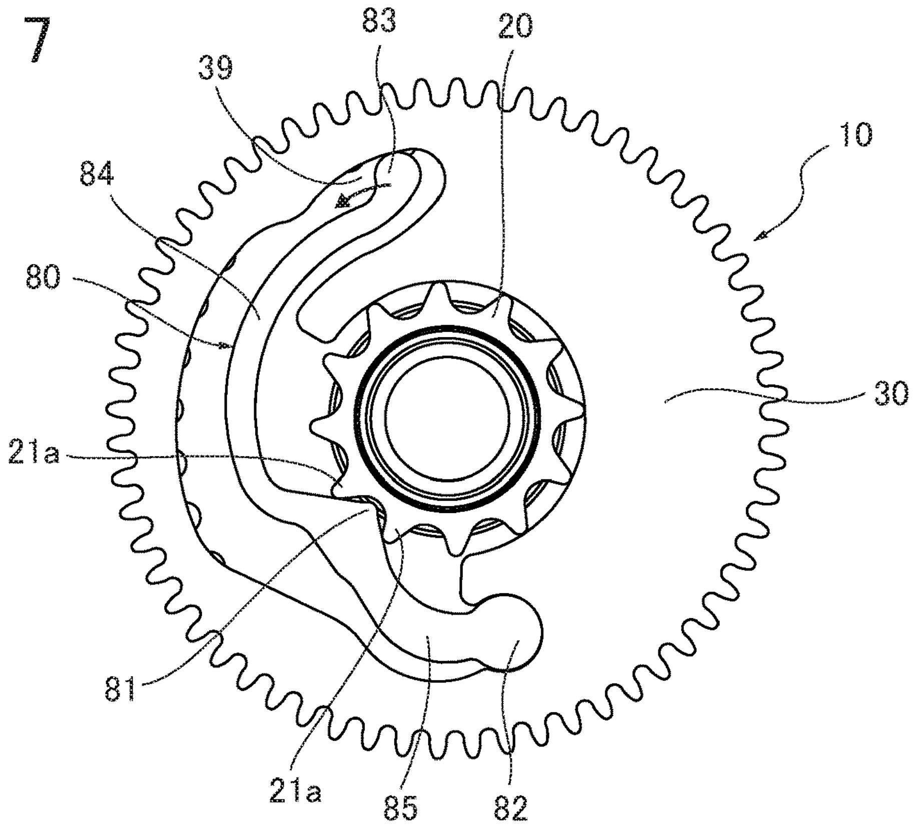
FIG. 7 is a bottom view corresponding to that of FIG. 2B and illustrating a second variation where another cylinder index lever is used instead of the cylinder index lever and the cylinder index spring of the embodiment.

(Second Variation) FIG. 7 is a bottom view corresponding to that of FIG. 2B and illustrating a second variation where another cylinder index lever 80 is used instead of the cylinder index lever 40 and the cylinder index spring 50 of the above embodiment. In the time difference correction mechanism 10 of the above embodiment, the fixed end 51 of the cylinder index spring 50 is integrated with the cylinder index gear 30. However, the cylinder index spring of the present disclosure may not be integrated with the cylinder index gear but may be separated therefrom. For example, the cylinder index spring may be integrated with the cylinder index lever 40.

Specifically, as shown in FIG. 7, the cylinder index lever 80, which is formed by combining the cylinder index lever and the cylinder index spring, includes a lever portion 85 corresponding to the cylinder index lever 40, and a spring portion 84 corresponding to the cylinder index spring 50.

The lever portion 85 includes a rotation supported portion 82 corresponding to the rotation supported portion 42 and a claw 81 corresponding to the claw 41. The thickness and length of the lever portion 85 are the same as those of the cylinder index lever 40.

A first end of the spring portion 84 is integral with the claw 81 of the lever portion 85. A second end of the spring portion 84 includes a spring sliding portion 83. The spring sliding portion 83 is placed or hooked to the inner edge of a recess or notch 39 formed in the cylinder index gear 30. The thickness and length of the spring portion 84 are the same as those of the cylinder index spring 50.

When the claw 81 moves from the engaged position M to the disengaged position N, the movement of the first end of the spring portion 84 integral with the claw 81 causes the spring sliding portion 83 to move counterclockwise along the inner edge of the notch 39. Thereby, the spring portion 84 bends or flexes due to the contour of the inner edge of the notch 39, and accordingly, the first end of the spring portion 84 biases the lever portion 85 to the engaged position M.

The second variation configured as above can also achieve effects similar to those of the above embodiment and the first variation.

The timepieces 100 of the embodiment as well as the first and second variations have been described as the electronic timepiece in which the motor is used as a drive power source as an example. However, the timepiece with the time difference correction mechanism of the present disclosure is not limited to the electronic timepiece but may be applied to a mechanical timepiece in which a mainspring is used as the drive power source.

The invention claimed is:

1. A time difference correction mechanism, comprising:

a cylinder index star wheel that comprises teeth on an outer circumference thereof and is configured to connect to an hour hand;

a cylinder index gear that comprises a bearing hole within a body of the cylinder index gear and teeth on an outer circumference of the cylinder index gear and is configured to connect to a minute hand, the cylinder index gear provided radially outward of the cylinder index star wheel and disposed on a same plane as the teeth of the cylinder index star wheel and coaxially with the cylinder index star wheel;

a cylinder index lever that is disposed in the cylinder index gear and on a same plane as the cylinder index gear, the cylinder index lever comprising a first end with a claw and a second end opposite the first end with a rotation supported portion having an axis and configured to be received by the bearing hole such that the cylinder index lever is rotatably coupled with the cylinder index gear; and a cylinder index spring that is disposed in the cylinder index gear and on the same plane as the cylinder index gear, wherein the cylinder index lever is configured to be movable rotatable about its axis between an engaged position where the claw of the cylinder index lever engages with at least one of the teeth of the cylinder index star wheel and a disengaged position where the claw disengages with the at least one of the teeth of the cylinder index star wheel, wherein the cylinder index spring is configured to bias the cylinder index lever to the engaged position, and wherein a change of a position of the cylinder index lever in a direction of the axis is restricted by support portions that sandwich the cylinder index lever in the direction of the axis, wherein the cylinder index lever is formed independently from the cylinder index gear.

2. The time difference correction mechanism according to claim 1, wherein a contour of the claw is formed by two lines and each of the two lines has a contour that curves relative to the teeth of the cylinder index star wheel at a location before an intersection of the two lines.

3. The time difference correction mechanism according to claim 1, wherein the cylinder index spring is formed independently from the cylinder index gear.

4. The time difference correction mechanism according to claim 3, wherein a fixed end of the cylinder index spring is fitted into the cylinder index gear and fixed thereto.

5. A time difference correction mechanism comprising:

a cylinder index star wheel that comprises teeth on an outer circumference thereof and is configured to connect to an hour hand;

a cylinder index gear that comprises a bearing hole within a body of the cylinder index gear and teeth on an outer circumference of the cylinder index gear and is configured to connect to a minute hand, the cylinder index gear provided radially outward of the cylinder index star wheel and disposed on a same plane as the teeth of the cylinder index star wheel and coaxially with the cylinder index star wheel; and a cylinder index lever that is disposed in the cylinder index gear and on a same plane as the cylinder index gear, wherein the cylinder index lever comprises a lever portion and a spring portion integrally formed with each other, wherein the lever portion comprises a first end with a claw and a second end opposite the first end with a rotation supported portion configured to be received by the bearing hole;

wherein the spring portion comprises a first end integral with the claw of the lever portion and a second end opposite the first end with a spring sliding portion placed relative to an inner edge of a recess in the cylinder index gear, wherein the cylinder index lever is configured to be rotatable about its axis between an engaged position where the claw of the lever portion engages with at least one of the teeth of the cylinder index star wheel and a disengaged position where the claw disengages with the at least one of the teeth of the cylinder index star wheel, wherein the spring portion is configured to bias the lever portion to the engaged position, and wherein a change of a position of the cylinder index lever in a direction of the axis is restricted by support portions that sandwich the cylinder index lever in the direction of the axis.

6. The time difference correction mechanism according to claim 5, wherein an end of the cylinder index spring is a sliding portion that is movable with respect to the cylinder index gear.

7. A timepiece comprising:

the time difference correction mechanism according to claim 1, the hour hand, and the minute hand;

wherein the hour hand is connected to the cylinder index star wheel of the time difference correction mechanism; and wherein the minute hand is connected to the cylinder index gear of the time difference correction mechanism.

8. The time difference correction mechanism according to claim 1, wherein the rotation supported portion comprises an outer circumferential edge that is formed in an arc shape.

9. The time difference correction mechanism according to claim 5, wherein the rotation supported portion comprises an outer circumferential edge that is formed in an arc shape.

10. A timepiece comprising:

the time difference correction mechanism according to claim 5, the hour hand, and the minute hand;

wherein the hour hand is connected to the cylinder index star wheel of the time difference correction mechanism; and wherein the minute hand is connected to the cylinder index gear of the time difference correction mechanism.

* * * * *